Jan. 7, 1936.  P. E. HELLER  2,027,040
CURVED TOOTH FILE
Filed Sept. 24, 1934
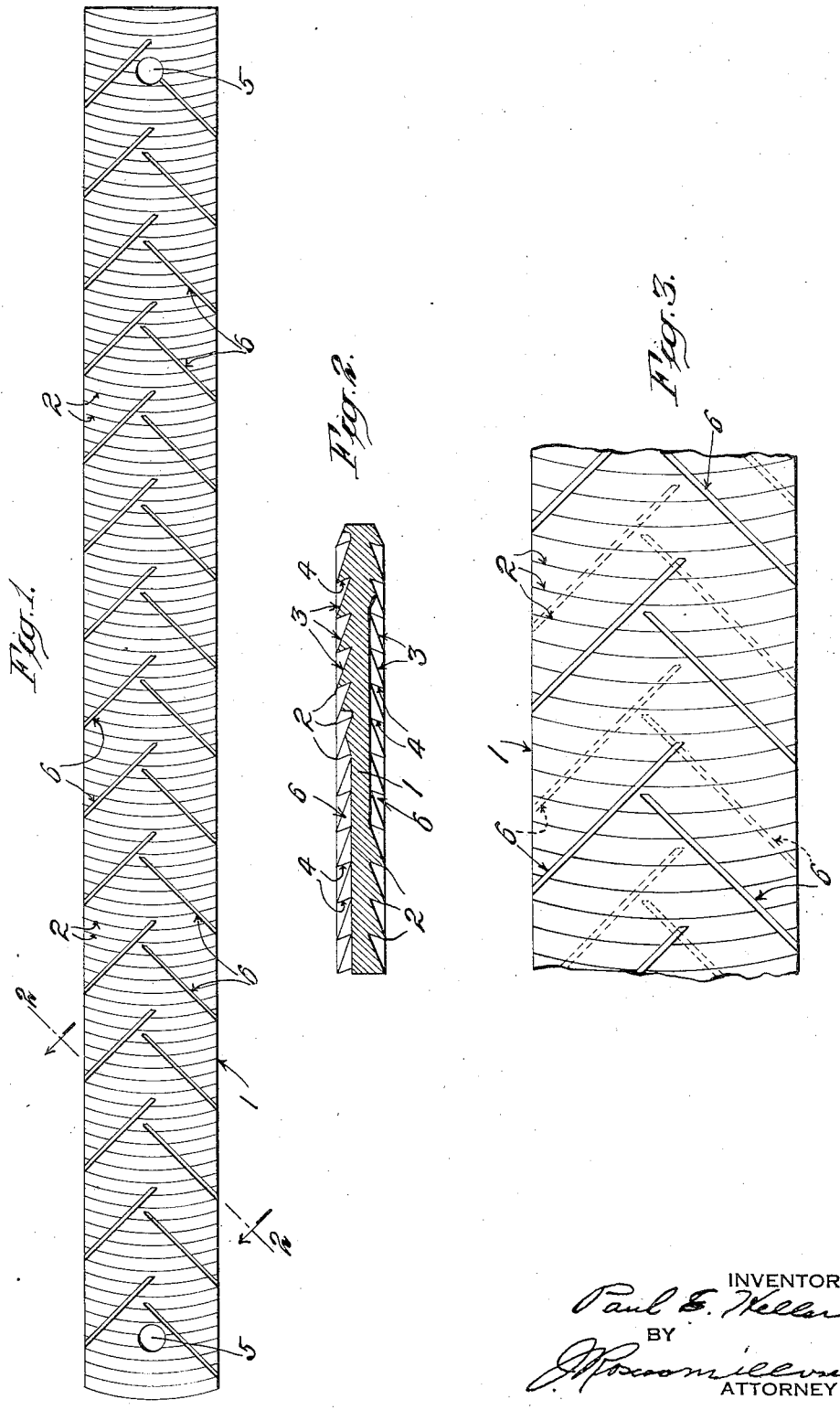
INVENTOR
Paul E. Heller
BY
ATTORNEY Patented Jan. 7, 1936

2,027,040

UNITED STATES PATENT OFFICE 2,027,040

CURVED TOOTH FILE

Paul Elias Heller, Newark, N. J.

Application September 24, 1934, Serial No. 745,311

1 Claim. (Cl. 29—78)

The present invention relates to the art of file manufacture and consists of an improved method of making files resulting in a superior file adapted for greater efficiency in metal working or cutting than files of the general type as heretofore made.

The improved file of the present invention is of the type known as "curved tooth" files wherein the cutting teeth are of curved or arcuate formation extending transversely of the file body and undercut to obtain an acute cutting edge. This type of file is particularly adapted for metal working such as the trimming of automobile body work and the like where high tool efficiency is an important factor.

This type of file as heretofore made, preferably by a milling operation, has its arcuate teeth formed to provide a continuous cutting edge extending the full width of the cutting face of the file body from which it results that in use, particularly during the initial or roughing operation, the filings or shavings removed are relatively large or long from which it results in the filing of certain metals that there is a tendency of the chips to adhere to the working face of the file thereby interfering with the proper action of the file upon subsequent strokes, marring of the work &c. The object of the present improvements is to eliminate this objection which is accomplished by sub-dividing of the curved teeth to a degree adapted to reduce the length of the chips or shavings sufficiently to overcome the adhering tendency while preserving substantial widths of the cutting edges essential in obtaining the improved cutting action incident to the use of this curved tooth type of file. The sub-dividing of the teeth is effected by the provision of angularly disposed cuts bisecting the curved tooth formations in a spaced relation to obtain a desired sub-division of the arcuate teeth and further in accordance with my improvements in a reversed angular relation or V formation in a centrally overlapping relation designed to oppose resultant lateral thrusts in the filing action.

The foregoing and other features and advantages of my present improvements will be more fully understood by reference to the accompanying drawing wherein like reference characters are applied to the corresponding parts in the several views.

In the drawing:

Fig. 1 is a plan view of a curved tooth type of file made in accordance with my invention.

Fig. 2 is a cross sectional view thereof taken on line x—x thereof.

Fig. 3 is a fragmentary, enlarged view of a portion of Fig. 1.

In the approved embodiment of the features of my invention as herein illustrated, 1 indicates the body of a file having upon its opposite faces transversely extending, arcuate cutting teeth 2 customarily formed by a rotary milling cutter designed to produce file cutting teeth having inclined outer faces 3 and undercut front faces 4 thereby to produce acute cutting edges as shown in Fig. 2. The file blanks are customarily cut similarly upon both of its opposite faces, punched at 5—5 for securing the blanks to the holders and subsequently hardened to produce the finished file.

In accordance with the present invention, the blanks prior to hardening, are in addition grooved or cut in angular relation to the cutting teeth to produce the angularly disposed grooves or cuts 6—6 having a depth substantially equal to the depth of the cutting teeth and spaced to sub-divide the arcuate teeth into segments of substantial length but of materially less than the full width teeth as heretofore employed. The relatively wide spacing of the dissecting grooves 6 thus produces a file retaining the cutting characteristics of the usual curved tooth file while effecting a shortened length of the shavings sufficient to overcome the objectionable adhering tendencies referred to.

A further improvement consists in the arrangement of the dissecting grooves 6 as shown in substantially V formation, the opposite parallel series of cuts having reversed angular relation and being slightly staggered with each of the grooves crossing the central axis of the file. The result thereof is a varied length subdivision of the arcuate teeth and a balancing of the file against lateral thrust in the filing action.

The dissecting grooves 6 may be formed by suitably arranged rotary saws either before or after milling of the cutting teeth or they may be produced by chisel action prior to the milling of the teeth as may be desired. Also, as will be understood, the arcuate cutting teeth of the improved file may be struck up by chisel action in the production of the files in lieu of the milling thereof.

Having described my invention, I claim:

As a new article of manufacture, a file formed with transversely extending arcuate cutting teeth and having relatively widely spaced, angularly disposed grooves dissecting the cutting teeth, said dissecting grooves being arranged in series of parallel grooves at opposite sides of the cutting face, the respective series being in reverse angular relation and each of the grooves having a length to extend slightly across the longitudinal axis of the file cutting face.

PAUL E. HELLER.